March 27, 1962    E. C. EICHSTADT    3,027,188
REMOVABLE AND REVERSIBLE VEHICLE TAILGATE MOUNTING
Filed Jan. 26, 1961
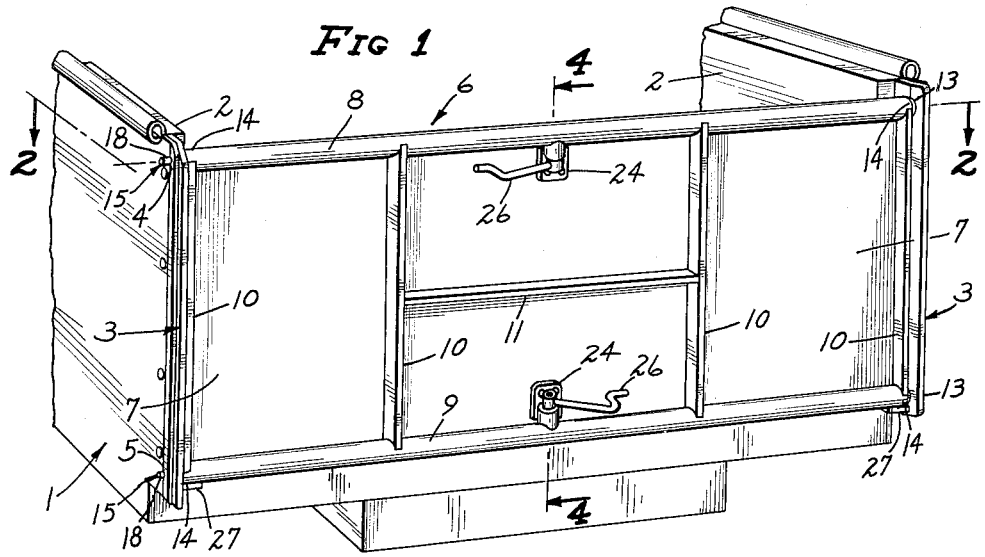
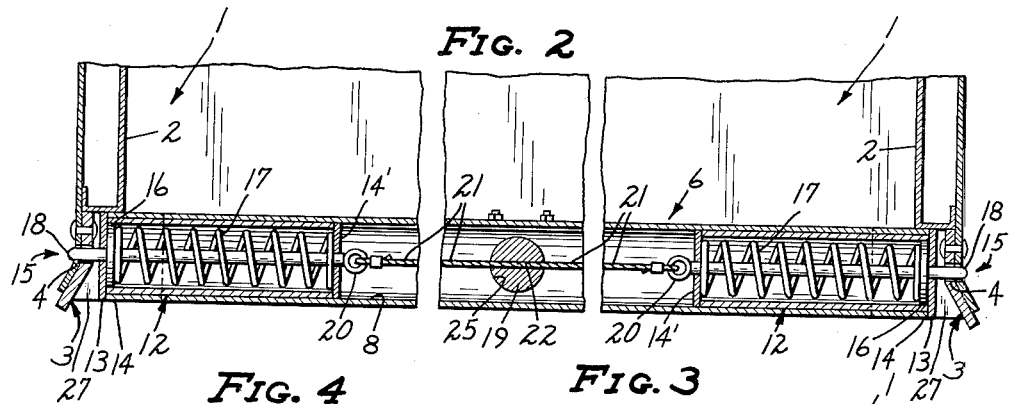
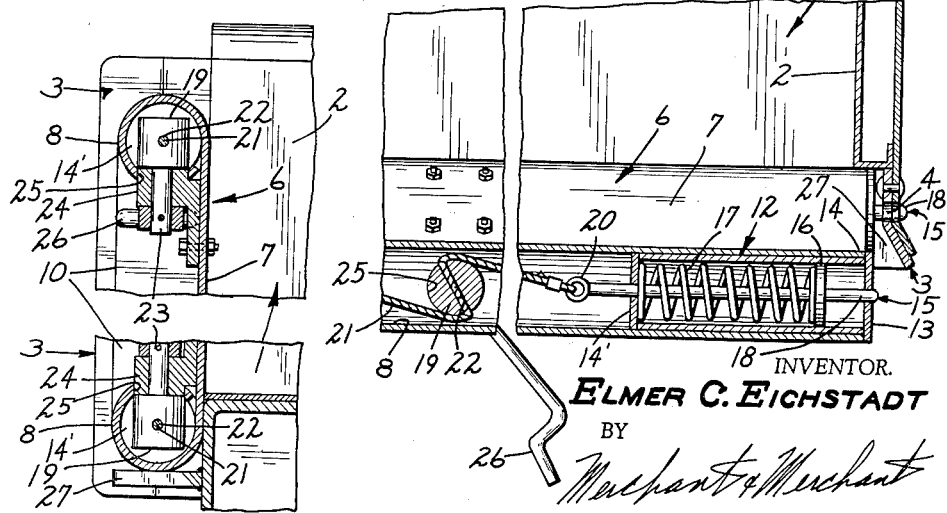
INVENTOR.
ELMER C. EICHSTADT
BY
Merchant & Merchant
ATTORNEYS

United States Patent Office 3,027,188
Patented Mar. 27, 1962

3,027,188
REMOVABLE AND REVERSIBLE VEHICLE
TAILGATE MOUNTING
Elmer C. Eichstadt, Sanborn, Minn.
Filed Jan. 26, 1961, Ser. No. 85,159
1 Claim. (Cl. 296—51)

My invention relates generally to improvements in vehicle body tailgates and has for its primary object the provision of a tailgate having upper and lower detachable latch-acting pivot hinges whereby said end gate may be swung pivotally either from the top or the bottom thereof, as conditions may require, or the gate may be removed entirely from the body.

A further object of my invention is the provision of a device of the class above described which is constructed in a simple and inexpensive manner so as to make same available to the public at a minimum of cost.

A further object of my invention is the provision of a device of the class above described which incorporates novel and highly efficient latching and hinging mechanism for said gate, and which is rugged and durable.

The above and still further objects of my invention will become apparent from the following detailed specification, appended claims and attached drawings.

Referring to the drawings wherein like characters indicate like parts throughout the several views:

FIG. 1 is a fragmentary view in perspective of the vehicle body, showing my novel tailgate secured thereto;

FIG. 2 is a view in horizontal section taken substantially on the line 2—2 of FIG. 1, some parts broken away;

FIG. 3 is an enlarged fragmentary view of the right hand portion of FIG. 2, showing a different position of some of the parts; and FIG. 4 is an enlarged fragmentary view in section taken on the line 4—4 of FIG. 1.

Referring with greater particularity to the drawings, the numeral 1 indicates in its entirety a vehicle body having laterally spaced upstanding side walls 2 which define vertically disposed parallel tailgate mounting bars 3 at their rear end portions. Adjacent their upper end portions the mounting bars 3 are bored to define opposed upper keeper openings 4 and are similarly bored at their lower end portions to define opposed keeper openings 5.

My novel removable and reversible tailgate assembly is identified in its entirety by the numeral 6 and is preferably stamped and formed from sheet steel or other suitable metal to form a rectangular closure panel 7. The upper and lower edges of the panel 7 are rolled rearwardly to define tubular upper and lower latch mechanism housings 8 and 9 which extend the entire length of the panel 7. Extending vertically between the housings 8, 9 are reinforcing members 10. Preferably, and as shown, a horizontally disposed reinforcing bar 11 extends between the vertical reinforcing members 10 intermediate the plane of the housings 8, 9.

It will be noted that the longitudinal axes of the housings 8, 9 are alignable with the axes of the upper and lower keeper openings 4, 5 in the mounting bars 3. Snugly received in the opposite end portions of the tubular housings 8, 9 are elongated tubular inserts 12 having radially enlarged outer end plates 13 which rest upon the adjacent end portions 14 of the housings 8, 9 and limit axially inward movements of each of said inserts 12. Both the enlarged outer end plates 13 as well as the reduced inner end plates 14' of the tubular inserts 12 are annular. Through the aligned central apertures of the end plates 13, 14' are slidably received latch-acting pivot pins 15. Rigidly secured to each of the pivot pins within the inserts 12 are abutment members 16. Interposed between the abutment members of each of the pins 15 and the end plates 14' of the several inserts 12 are coil compression springs 17 which yieldingly bias the pivot-latch-acting outer end portions 18 of the pins 15 toward their extended positions shown in FIG. 2, the engagement of the abutment members 16 with the outer end plates 13 limiting extending movements beyond positions shown in FIG. 2.

Within each of the housings 8, 9 intermediate the pins 15 is a winding spool 19 which is journalled for rotation on an axis normal to the axis of said housings 8, 9. As shown, the opposed inner ends of the latch-hinge pins 15 are formed to define loops 20 which engage opposite ends of a flexible tie member 21. The intermediate portion of the tie member 21 is shown as extending diametrically through an opening 22 in the winding spool 19 whereby, when rotary movements are imparted to the winding spool, said flexible tie member will be wound in opposite directions thereon, thus simultaneously retracting the latch-hinge pins 15 to inoperative position indicated by FIG. 3.

For the purpose of imparting limited rotation to the winding spool 19 a shaft 23 is made fast to said winding spool 19. The shaft 23 is journalled in a bearing bracket 24, which is suitably mounted on the panel 7 and projects radially outwardly through an aperture 25 in the housings 8, 9, as shown particularly in FIG. 4. At its projected outer end the shafts 23 are provided with crank-acting handles 26. Preferably, and as shown, the handles 26 extend in opposite directions and are normally biased toward engagement with the panel 7 when the pins are in the extended positions shown in FIG. 2.

The extended ends 18 of the latch-hinge pins 15 are of such a diameter as to be snugly receivable within the keeper openings 4, 5 when in alignment therewith. Consequently, when it is desired to swing out only the lower end portion of the gate 6 for dumping this may be done by imparting limited rotary movements to the lower handle 26 in a clockwise direction. However, when it is desired to swing only the upper end portion of the gate downwardly for loading or unloading, the pivot-hinge pins 15 associated with the lower housing 9 are retained within the keeper openings 5 and limited rotation in counter-clockwise direction is imparted to the upper handle 26 to retract the latch-pivot pins 15 from the upper keeper openings 4. It is likewise equally apparent that the tailgate 6 may be removed entirely from the body 1 by imparting simultaneous limited rocking movements to the handles 26 in opposite directions.

To facilitate replacement of the tailgate 6 in its operative position, as shown particularly in FIG. 1, the vertically disposed mounting bars 3 are flared laterally outwardly in opposite directions, as indicated particularly in FIG. 2. Furthermore in order to facilitate such replacement, as well as to reduce the amount of frictional engagement exerted by the latch-acting pivot pins 15 upon the mounting bars 3 when the tailgate 6 is mounted thereon, I provide horizontal supporting flanges 27, see particularly FIGS. 1 and 4.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What is claimed is:

A removable and reversible tailgate for use on a vehicle body having upstanding opposite sides which define opposed upper and lower keeper openings adjacent their rear vertical edges, said gate comprising a rectangular sheet metal panel the upper and lower edges of which are rearwardly rolled to define tubular latch mechanism housings, the axes of which are alignable respectively with said upper and lower keeper openings, elongated tubular inserts receivable in the opposite ends of said housings and each thereof having annular end plates at their inner ends and diametrically enlarged annular end plates at their outer ends which engage opposite ends of said housings and limit axially inward movements of said inserts with respect to said housings, elongated latch pins mounted for sliding movements in each cooperating pair of inner and outer end plates, the outer ends of each of said pins being receivable in an adjacent keeper opening when in an extended position and when aligned therewith, the inner ends of each of said pins being formed to define a loop, a winding spool within each of said housings intermediate the opposite inner ends of said tubular inserts, independent handle means externally of each of said housings and carried by said panel for imparting rotation to said spools, and flexible tie means within said housings extending between the looped inner ends of said latch pins, said flexible tie means having winding engagement with an adjacent one of said spools.

References Cited in the file of this patent

UNITED STATES PATENTS

| | | |
|---|---|---|
| 540,911 | George | June 11, 1895 |
| 912,378 | Jackson | Feb. 16, 1909 |
| 932,980 | Giermann | Aug. 31, 1909 |
| 2,742,317 | Chandler | Apr. 17, 1956 |